(12) United States Patent
Milton et al.

(10) Patent No.: US 11,364,795 B2
(45) Date of Patent: Jun. 21, 2022

(54) COMPRESSED NATURAL GAS FUELING SYSTEM WITH INTEGRATED FILL RECEPTACLE

(71) Applicant: WORTHINGTON INDUSTRIES, INC., Columbus, OH (US)

(72) Inventors: Trevor Milton, Santa Clara, UT (US); Morgan Mackelprang, Cedar City, UT (US); Ralph Hilton, Saint George, UT (US); Isaac Sloan, Saint George, UT (US)

(73) Assignee: WORTHINGTON INDUSTRIES INC., Columbus, OH (US)

( * ) Notice: Subject to any disclaimer, the term of this patent is extended or adjusted under 35 U.S.C. 154(b) by 58 days.

(21) Appl. No.: 16/849,112

(22) Filed: Apr. 15, 2020

(65) Prior Publication Data
US 2020/0238822 A1 Jul. 30, 2020

Related U.S. Application Data

(63) Continuation of application No. 16/547,751, filed on Aug. 22, 2019, now Pat. No. 10,668,807, which is a (Continued)

(51) Int. Cl.
*B60K 15/07* (2006.01)
*F17C 13/08* (2006.01)
(Continued)

(52) U.S. Cl.
CPC ........ *B60K 15/07* (2013.01); *B60K 15/03006* (2013.01); *B60K 15/063* (2013.01); *B60R 9/06* (2013.01); *F17C 1/005* (2013.01); *F17C 5/06* (2013.01); *F17C 13/084* (2013.01); *B60K 2015/03019* (2013.01); *B60K 2015/0638* (2013.01); *B60Y 2200/148* (2013.01); *F17C 2201/0109* (2013.01); *F17C 2201/035* (2013.01); *F17C 2201/054* (2013.01); *F17C 2205/0107* (2013.01); *F17C 2205/0111* (2013.01); *F17C 2205/0142* (2013.01); *F17C 2205/0146* (2013.01);
(Continued)

(58) Field of Classification Search
CPC ............. B60K 15/07; B60K 15/03006; B60K 15/063; B60K 2015/0638; B60R 9/06
See application file for complete search history.

(56) References Cited

U.S. PATENT DOCUMENTS 4,527,600 A   7/1985 Fisher et al.
4,646,940 A * 3/1987 Kramer ................. F17C 13/025
                                                141/197
(Continued)

OTHER PUBLICATIONS

ACT Expo 2013, State of the Art in an Evolving Natural Gas Insutry, Jun. 24, 2013, 16 pgs.
(Continued)

*Primary Examiner* — Jacob D Knutson
(74) *Attorney, Agent, or Firm* — Tucker Ellis LLP

(57) ABSTRACT

A compressed natural gas fueling system includes a frame arrangement with at least one tank disposed therein and an inlet that can receive a compressed natural gas fueling nozzle to fill the at least one tank. The fueling system can be attached with and supported by frame rails behind a cabin of a vehicle such that the inlet is positioned above the frame rails.

20 Claims, 4 Drawing Sheets

Related U.S. Application Data continuation of application No. 16/154,925, filed on Oct. 9, 2018, now Pat. No. 10,449,853, which is a continuation of application No. 15/256,792, filed on Sep. 6, 2016, now Pat. No. 10,118,483, which is a continuation of application No. 14/076,836, filed on Nov. 11, 2013, now Pat. No. 9,499,047.

(51) Int. Cl.
| | | |
|---|---|---|
| *B60K 15/063* | (2006.01) | |
| *B60K 15/03* | (2006.01) | |
| *B60R 9/06* | (2006.01) | |
| *F17C 5/06* | (2006.01) | |
| *F17C 1/00* | (2006.01) | |

(52) U.S. Cl.
CPC ............. *F17C 2221/033* (2013.01); *F17C 2223/0123* (2013.01); *F17C 2223/036* (2013.01); *F17C 2225/0123* (2013.01); *F17C 2225/036* (2013.01); *F17C 2250/043* (2013.01); *F17C 2270/0171* (2013.01)

(56) References Cited

U.S. PATENT DOCUMENTS

| | | | |
|---|---|---|---|
| 6,138,770 A | 10/2000 | Kayser | |
| 6,378,823 B1 | 4/2002 | Edholm | |
| 6,708,719 B2* | 3/2004 | Idoguchi | F17C 13/04 137/266 |
| 6,896,318 B2* | 5/2005 | Marrs | B62D 27/02 280/833 |
| 7,744,127 B2* | 6/2010 | Essinger | B60K 15/07 280/830 |
| 8,408,600 B2* | 4/2013 | Kondo | B60K 15/07 280/834 |
| 9,909,535 B2 | 3/2018 | Sirosh | |
| 10,118,483 B2 | 11/2018 | Milton | |
| 10,668,807 B2* | 6/2020 | Milton | F17C 1/005 |
| 2010/0078244 A1* | 4/2010 | Pursifull | B60K 15/07 180/69.5 |

OTHER PUBLICATIONS

Photos of a natural gas fueling system, printed on Oct. 25, 2013, 2 pgs.
Salem, Luis, Agility Introduces All-New CNG Rail-Mounted Fuel Systems, Press Release, Mar. 22, 2012; 2 pages, Santa Ana, CA.
Salem, Luis, Agility launces an All-New CNG Product, Offering the Most Space Efficient Natural Gas Fuel System in the Market, Press Release, Jun. 24, 2013; 2 pages, Santa Ana, CA.
Showtimes—Alternative Fuels & Vehicles National Conference & Expo; Monday, Apr. 2, 2007; 19 pages.
Showtimes—Alternative Fuels & Vehicles National Conference & Expo; Tuesday, Apr. 3, 2007; 19 pages.
Journal of Innovative Mangement; vol. 9, No. 3; Spring 2004; 68 pages.

* cited by examiner

COMPRESSED NATURAL GAS FUELING SYSTEM WITH INTEGRATED FILL RECEPTACLE

RELATED APPLICATION(S)

This U.S. patent application claims priority to and is a continuation patent application of U.S. patent application Ser. No. 16/547,751 filed on Aug. 22, 2019. U.S. patent application Ser. No. 16/547,751 is a continuation patent application of U.S. patent application Ser. No. 16/154,925 filed on Oct. 9, 2018. U.S. patent application Ser. No. 16/154,925 claims priority to and is a continuation patent application of U.S. patent Ser. No. 15/256,792 filed on Sep. 6, 2016 (now U.S. Pat. No. 10,118,483). U.S. patent application Ser. No. 15/256,792 claims priority to and is a continuation patent application of U.S. patent application Ser. No. 14/076,836 filed on Nov. 11, 2013 (now U.S. Pat. No. 9,499,047). The entireties of the patent applications mentioned in this paragraph are herein incorporated by reference.

TECHNICAL FIELD

This disclosure relates to on-board compressed natural gas storage (CNG) systems for vehicles powered by CNG.

BACKGROUND

Compressed natural gas (CNG) may be used as a fuel for certain vehicles. Unlike gasoline, CNG is typically stored in several on-board high-pressure tanks. These tanks and associated component may be retrofit to the vehicle after initial assembly.

SUMMARY

A compressed natural gas fuel system includes a housing that can be disposed behind a cabin of a truck, at least one tank within the housing, and an inlet that can receive a compressed natural gas fueling nozzle and be in fluid communication with the at least one tank. The housing can further be attached with and supported by frame rails of the truck such that the at least one tank and inlet are positioned above the frame rails.

A compressed natural gas fuel system includes a frame that can be disposed behind a cabin of a truck, a plurality of tanks within and supported by the frame, and a fill receptacle that can receive compressed natural gas for at least one of the tanks. The frame can further be supported by frame rails of the truck such that the tanks and fill receptacle are positioned above the frame rails.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
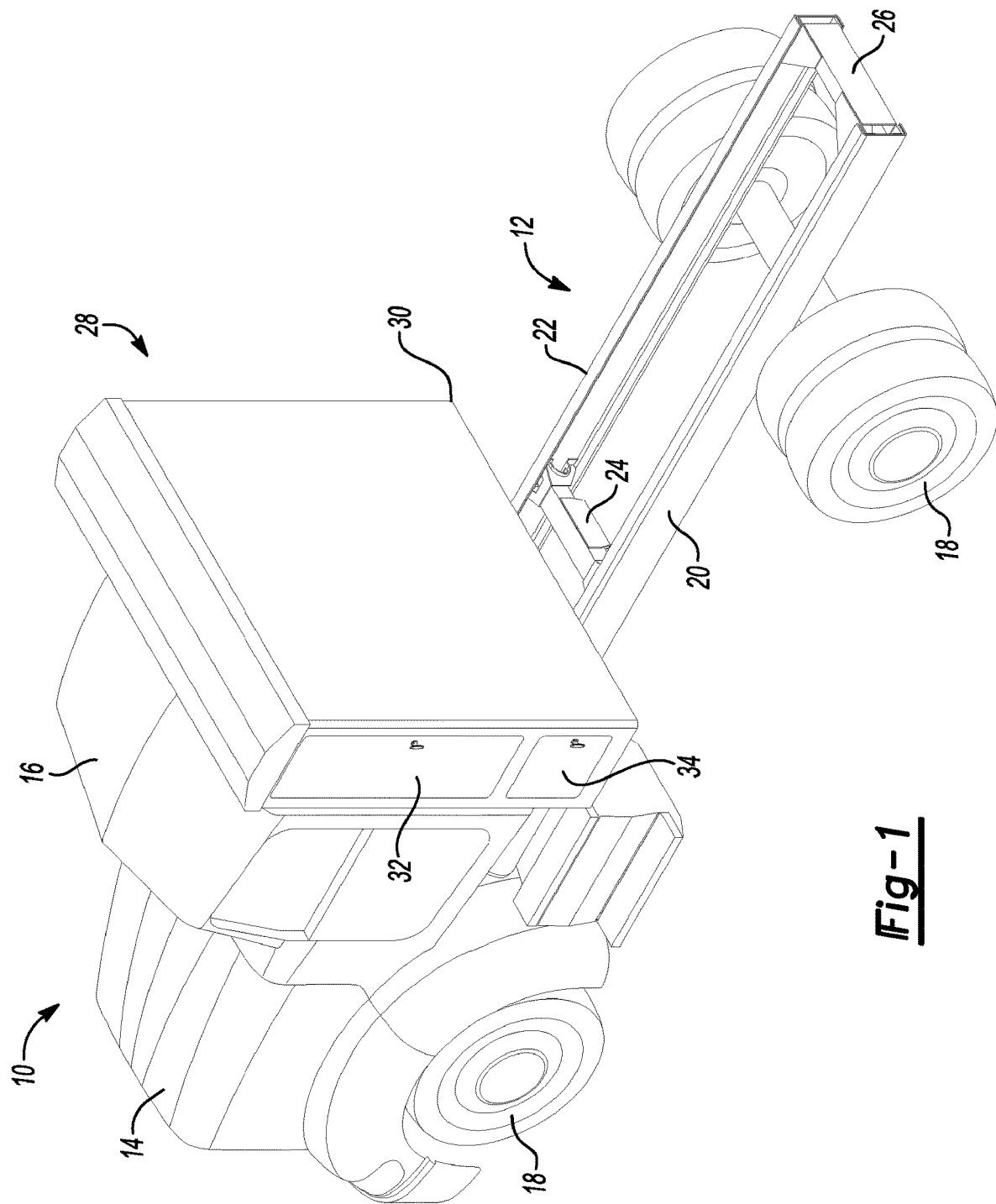
FIG. 1 is a perspective view of a truck outfitted with a compressed natural gas (CNG) fueling system.

Referring to FIG. 1, a truck 10 includes a frame 12 having a front end 14, cabin 16 and wheel tire/axle assemblies 18 attached therewith. The frame 12 includes frame rails 20, 22, which are arranged generally parallel to and spaced apart from one another, and cross members 24, 26 attached with the frame rails 20, 22 to provide structural support for the frame rails 20, 22.

A compressed natural gas (CNG) fueling system 28 is supported on and attached with the frame rails 20, 22 and positioned behind the cabin 16. The CNG fueling system 28 provides for the storage of CNG that can be used to power movement of the truck 10. The CNG fueling system 28, in this example, includes a housing 30 with access panels 32, 34. And, the width is approximately equal to the width of the truck 10 so as to not significantly impact aerodynamic properties of the truck 10.

Figure 2:
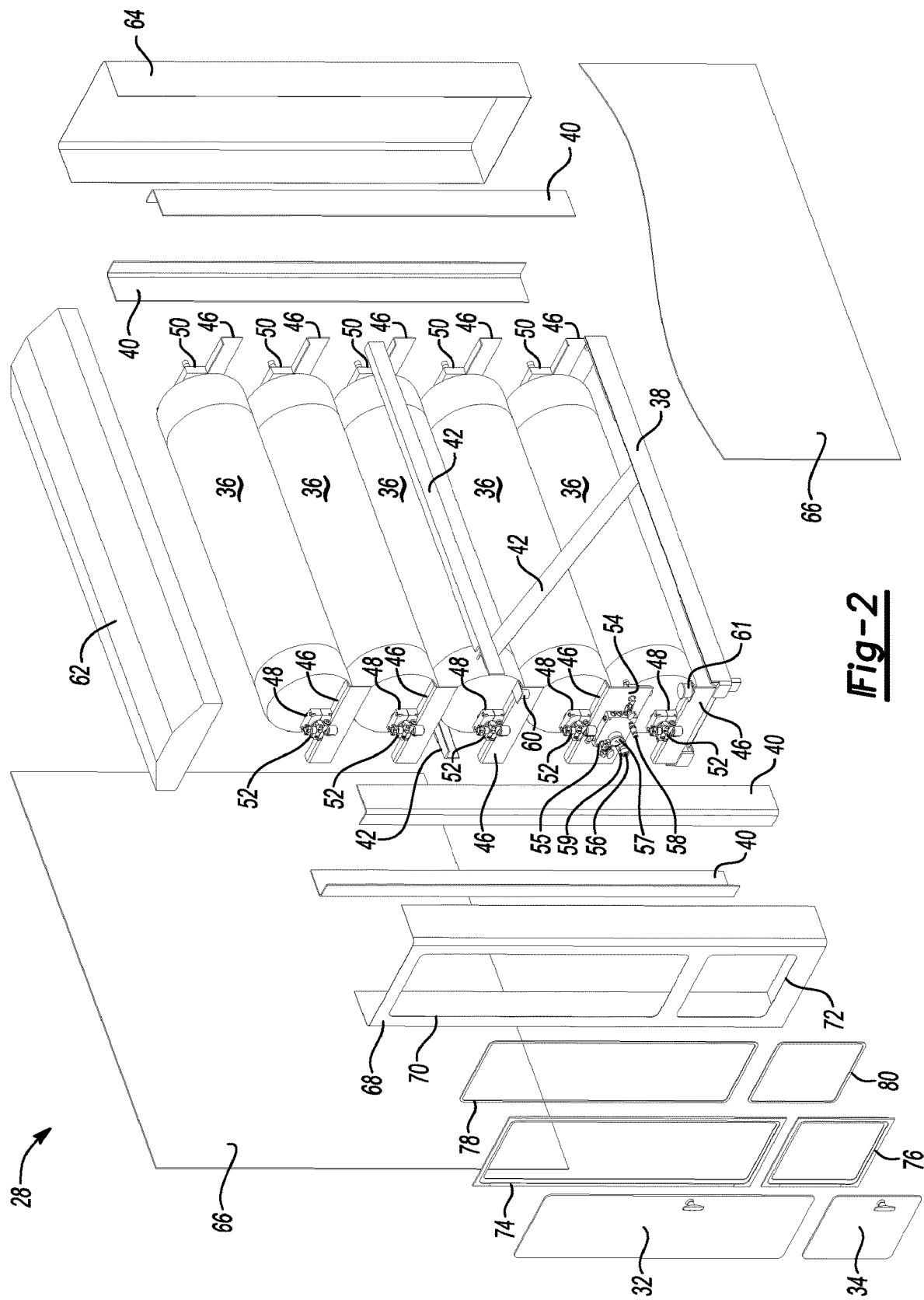
FIG. 2 is an exploded assembly view of a CNG fueling system.
Figure 3:
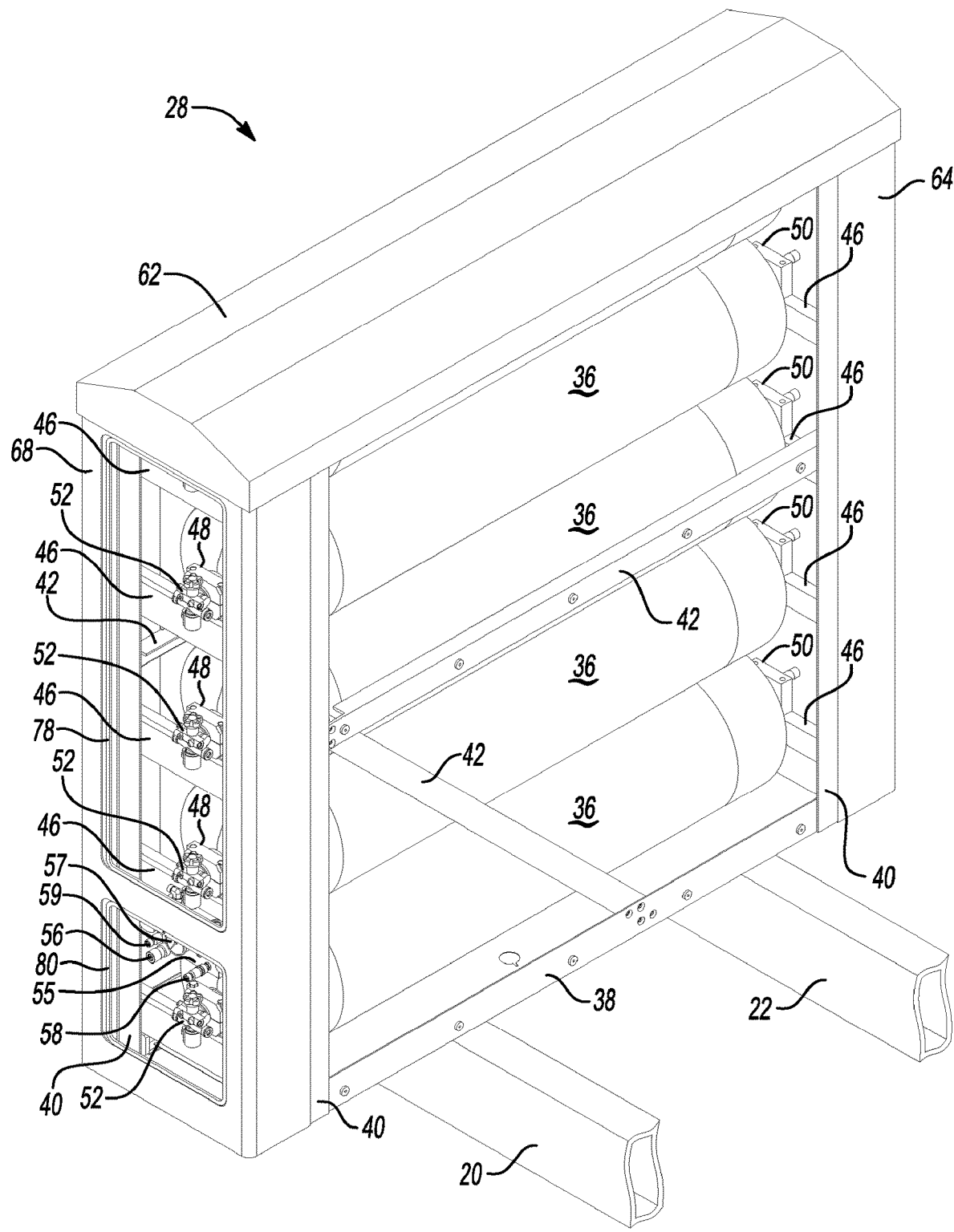
FIG. 3 is a perspective view of a CNG fueling system with access and side panels removed.
Figure 4:
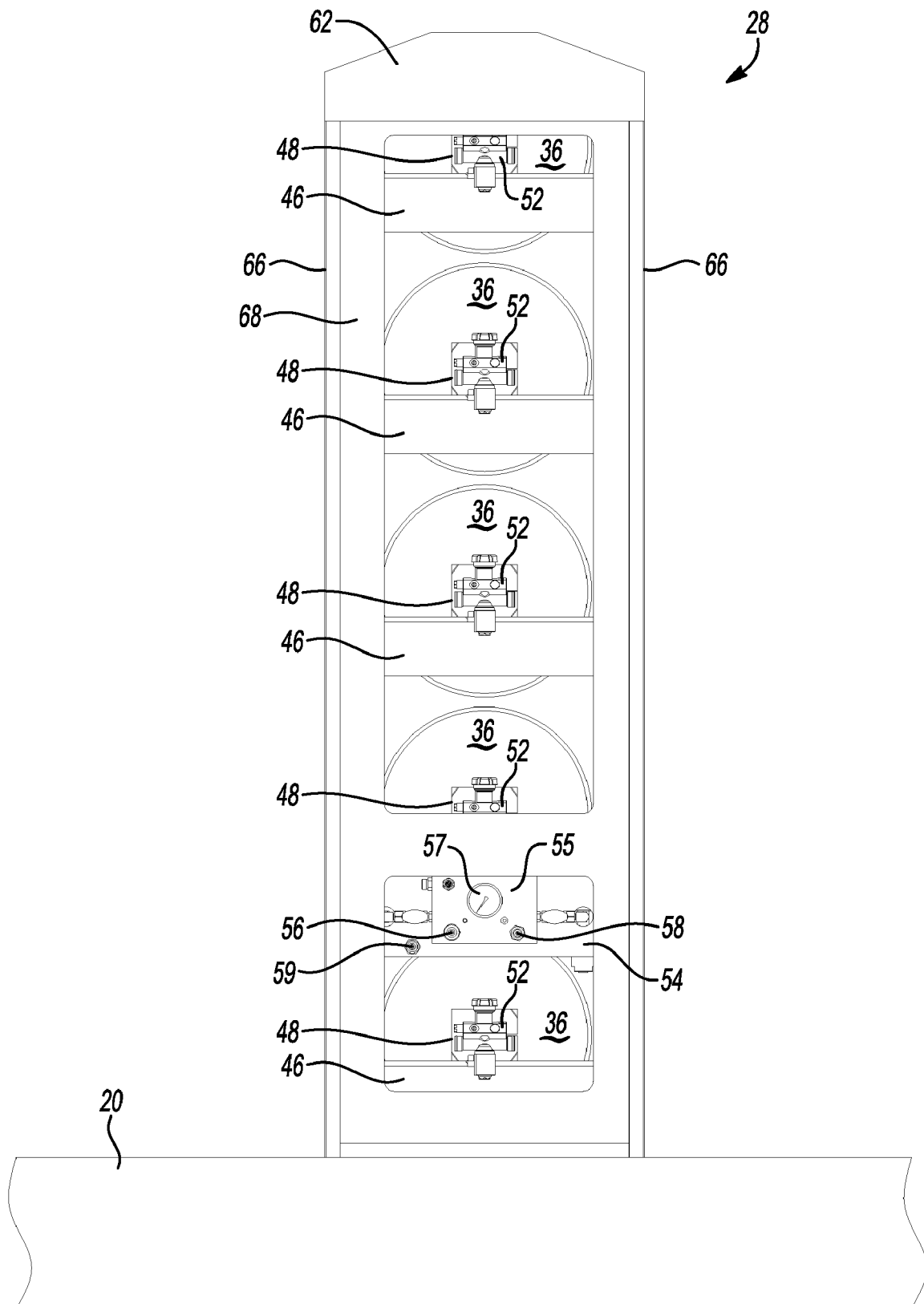
FIG. 4 is a front view of a CNG fueling system supported on frame rails.

Referring to FIGS. 2 through 4, the CNG fueling system 28 includes a plurality of cylindrical tanks 36 stacked in this example, on their sides such that their axes are oriented generally perpendicular to the frame rails 20, 22. In other examples, the tanks 36 may take any suitable form and be arranged in any suitable fashion.

Base 38, corner brackets 40 and cross braces 42 are arranged to form a frame within which the tanks 36 are mounted. Tank supports 46 are attached between the corner brackets 40 to reinforce the frame and provide mounting structures for the tanks 36.

Each of the tanks 36 includes front and rear mounts 48, 50 at opposing ends. The mounts 48, 50 are attached with the tank supports 46. Loads associated with the tanks 36 are transferred through the mounts 48, 50 and tank supports 46 to the corner brackets 40 and base 38. A valve assembly 52 is also operatively associated with each of the tanks 36. The valve assemblies 52 provide fluid access to the tanks 36.

A manifold mounting bracket 54 is attached with the corner brackets 40 on a same end of the CNG fueling system 28 as the front mounts 48. A manifold assembly 55 operatively arranged with a fill receptacle 56, high and low pressure gages 57, and outlet ports 58, 59 is attached with the manifold mounting bracket 54. The fill receptacle 56 is configured to receive a fueling nozzle for CNG. The manifold assembly 55 defines a series of passageways that connect with the valve assemblies 52 via piping (not shown) to direct CNG from the fill receptacle 56 to at least one of the valve assemblies 52 to fill the corresponding tank(s) 36. The high and low pressure gages 57 are arranged to indicate pressures associated with the CNG fueling system 28 (e.g., pressures within the tanks 36, etc.) The manifold assembly 55 further defines a series of passageways that connect with the valve assemblies 52 via the piping to direct CNG from the tanks to the outlet ports 58, 59 when actuated, to empty the tanks 36.

A filter 60 and regulator 61 are attached with the tank supports 46 above and below the manifold mounting bracket 54 respectively. The outlet port 59 connects with the filter 60 and regulator 61 via piping (not shown). The filter 60, as the name suggests, filters CNG from the tanks 36 before it passes to the regulator 61. The regulator 61 controls the flow of CNG provided to an engine of the vehicle 10.

In other examples, the manifold assembly 55, fill receptacle 56, high and low pressure gages 57, outlet ports 58, 59, filter 60, and regulator 61 (and any other components) may be mounted in any suitable location on or within the CNG fueling system 28. The manifold assembly 55, filter 60 and/or regulator 61, for example, each could be located near a top and on a different side of the CNG fueling system 28, etc. The manifold assembly 55, in still other examples, may be omitted such that the fill receptacle 56 and outlet ports 58, 59 fluidly connect with the valve assemblies 52 via piping (not shown) or the like. That is, a manifold need not be used to distribute CNG from the fill receptacle 56 to the tanks 36. The fill receptacle 56, in one such arrangement, may be located near a corner of the CNG fueling system 28 adjacent to the base 38. Other arrangements are also contemplated.

As apparent to those of ordinary skill, the fill receptacle 56, high and low pressure gages 57, outlet ports 58, 59, filter 60 and regulator 61 (as well as the entirety of the CNG fueling system 28) is positioned above the frame rails 20, 22. That is unlike previous systems, the fill receptacle 56 and associated components arranged to fluidly interface with the valve assemblies 52 and piping are carried by the frame of the CNG fueling system 28. This eliminates the need for a separate fuel management module including one or more fill receptacles and associated fluid interface components to be attached with the vehicle 10 such that, for example, the one or more fill receptacles are located below a top of the frame rails 20, 22. Eliminating the aforementioned module reduces complexity and therefore assembly time as fewer independent components are attached with the vehicle 10. Put a different way, integrating the fuel management module with the CNG fueling system 28 frees up space on a side of the frame rail 20 that would otherwise be occupied by a separate fuel management module.

The housing 30 further includes a cap 62 arranged to cover the tanks 36, a rear panel 64 attached with the corner brackets 40 on a side of the housing 30 opposite the access panels 32, 34, and side panels 66 attached with the base 38 and corner brackets 40, and spanning a width of the CNG fueling system 28. The housing 30 further includes a front panel 68 attached with the corner brackets 40 and defining openings 70, 72 to accommodate the access panels 32, 34 respectively, and associated panel frames 74, 76 and seals 78, 80 respectively. Other examples may lack a housing in favor of a frame, etc.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A fuel system, comprising:
a housing configured to be disposed behind a cabin of a vehicle;
a plurality of tanks disposed within the housing, wherein each of the plurality of tanks includes front and rear mounts at opposing ends, the front and rear mounts are attached to tank supports, and the tank supports are attached between corner brackets to provide mounting structures for the plurality of tanks;
a frame formed by at least one base member and at least one cross brace attached between the corner brackets, wherein the frame supports at least the plurality of tanks within the housing;
a filter and a regulator are each mounted on or within at least one of the housing or the frame, wherein the filter is configured to filter gas from the plurality of tanks, the regulator is configured to be in fluid communication with the filter; and
a fill receptacle configured to be in fluid communication with the plurality of tanks, wherein at least one of the housing or the frame are further configured to be attached with and supported by frame rails of the vehicle such that the plurality of tanks and the fill receptacle are positioned above the frame rails, and the plurality of tanks are stacked on each other such that axes of the plurality of tanks are oriented generally perpendicular to the frame rails.

2. The fuel system of claim 1, further comprising one or more valve assemblies that are operatively associated with each of the plurality of the tanks to provide fluid access to the plurality of the tanks via a piping.

3. The fuel system of claim 2, the one or more valve assemblies are positioned above the frame rails.

4. The fuel system of claim 2, the one or more valve assemblies are on or within at least one of the housing or frame.

5. The fuel system of claim 1, further comprising a manifold assembly in fluid communication with one or more of the plurality of tanks.

6. The fuel system of claim 5, the manifold assembly is configured to be mounted on or within at least one of the housing or frame.

7. The fuel system of claim 6, the manifold assembly is positioned above the frame rails.

8. The fuel system of claim 1, the manifold assembly includes at least one of the fill receptacle, a high pressure gauge, a low pressure gauge, or an outlet port.

9. The fuel system of claim 8, wherein the outlet port is in fluid communication with an engine of the vehicle.

10. The fuel system of claim 1, the filter filters the gas in the plurality of tanks prior to delivery to an engine of the vehicle.

11. The fuel system of claim 1, the regulator controls a portion of flow of the gas delivered to an engine of the vehicle from the plurality of tanks.

12. A fuel system, comprising:
a housing configured to be disposed behind a cabin of a vehicle;
a plurality of tanks disposed within the housing, wherein each of the plurality of tanks includes front and rear mounts at opposing ends, the front and rear mounts are attached to tank supports, and the tank supports are attached between corner brackets to provide mounting structures for the plurality of tanks;
a frame formed by at least one base member and; at least one cross brace attached between the corner brackets, wherein the frame supports at least the plurality of tanks within the housing;
a filter and a regulator are each mounted on or within at least one of the housing or frame, wherein the filter is configured to filter gas from the plurality of tanks, the regulator is configured to be in fluid communication with the filter;
a low pressure gauge and a high pressure gauge are each mounted on or within at least one of the housing or frame, wherein the low pressure gauge and the high pressure gauge indicate pressures with the fuel system; and
a fill receptacle configured to be in fluid communication with the plurality of tanks, wherein at least one of the housing or the frame are further configured to be attached with and supported by frame rails of the vehicle such that the plurality of tanks and the fill receptacle are positioned above the frame rails, and the plurality of tanks are stacked on each other such that axes of the plurality of tanks are oriented generally perpendicular to the frame rails.

13. The fuel system of claim 12, further comprising one or more outlet ports that empty at least one of the plurality of tanks when actuated.

14. The fuel system of claim 13, the one or more outlet ports are mounted on or within at least one of the housing or frame.

15. The fuel system of claim 12, further comprising one or more valve assemblies that are operatively associated with each of the plurality of the tanks to provide fluid access to at least one of the plurality of the tanks via a piping.

16. The fuel system of claim 15, the one or more valve assemblies are positioned above the frame rails.

17. The fuel system of claim 15, the one or more valve assemblies are within at least one of the housing or frame.

18. The fuel system of claim 12, further comprising a manifold assembly mounted on or within at least one of the housing or frame that is in fluid communication with one or more of the plurality of tanks.

19. The fuel system of claim 18, the manifold assembly includes at least one of the fill receptacle, the high pressure gauge, the low pressure gauge, or an outlet port that is configured to the plurality of tanks when actuated.

20. A fuel system, comprising:
a housing configured to be disposed behind a cabin of a vehicle;
a plurality of tanks disposed within the housing, wherein each of the plurality of tanks includes front and rear mounts at opposing ends, the front and rear mounts are attached to tank supports, and the tank supports are attached between corner brackets to provide mounting structures for the plurality of tanks;
a frame formed by at least one base member and at least one cross brace attached between the corner brackets, wherein the frame supports at least the plurality of tanks within the housing;
a filter and a regulator are each mounted on or within the housing or the frame, wherein the filter is configured to filter gas from the plurality of tanks, the regulator is configured to be in fluid communication with the filter;
a low pressure gauge and a high pressure gauge are each mounted on or within at least one of the housing or the frame, wherein the low pressure gauge and the high pressure gauge indicate pressures with the fuel system;
one or more outlet ports that are each mounted on or within the housing or the frame; and
a fill receptacle configured to be in fluid communication with the plurality of tanks, wherein at least one of the housing or the frame are further configured to be attached with and supported by frame rails of the vehicle such that the plurality of tanks and the fill receptacle are positioned above the frame rails, and the plurality of tanks are stacked on each other such that axes of the plurality of tanks are oriented generally perpendicular to the frame rails.

* * * * *